United States Patent
Fu et al.

(10) Patent No.: US 10,129,722 B2
(45) Date of Patent: Nov. 13, 2018

(54) SERVICE PROCESSING METHOD AND NETWORK DEVICE

(71) Applicant: Huawei Technologies Co., Ltd., Shenzhen (CN)

(72) Inventors: Tianfu Fu, Beijing (CN); Zhouyi Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 15/215,171

(22) Filed: Jul. 20, 2016

(65) Prior Publication Data

US 2016/0330569 A1 Nov. 10, 2016

Related U.S. Application Data

(63) Continuation of application No. PCT/CN2014/070897, filed on Jan. 20, 2014.

(51) Int. Cl.
| | |
|---|---|
| *H04W 4/60* | (2018.01) |
| *H04W 76/18* | (2018.01) |
| *H04W 76/10* | (2018.01) |
| *H04L 29/08* | (2006.01) |
| *G06Q 50/10* | (2012.01) |

(52) U.S. Cl.
CPC .............. *H04W 4/60* (2018.02); *G06Q 50/10* (2013.01); *H04L 67/02* (2013.01); *H04L 67/20* (2013.01); *H04L 67/327* (2013.01); *H04W 76/10* (2018.02); *H04W 76/18* (2018.02)

(58) Field of Classification Search
None
See application file for complete search history.

(56) References Cited

U.S. PATENT DOCUMENTS

| | | | | |
|---|---|---|---|---|
| 7,197,566 B1* | 3/2007 | Kuzma | ............... | H04L 65/4084 |
| | | | | 709/227 |
| 8,443,054 B2 | 5/2013 | Han | | |
| 9,158,747 B2* | 10/2015 | Lee | ......................... | G06Q 30/00 |
| 9,769,289 B2* | 9/2017 | Tateishi | ................ | H04L 69/169 |
| 2008/0207181 A1 | 8/2008 | Jiang | | |
| 2012/0286030 A1* | 11/2012 | Lee | .................... | G06F 17/30879 |
| | | | | 235/375 |

FOREIGN PATENT DOCUMENTS

| | | |
|---|---|---|
| CN | 101026502 A | 8/2007 |
| CN | 101141694 A | 3/2008 |
| CN | 101237333 A | 8/2008 |
| CN | 101453694 A | 6/2009 |
| CN | 101742465 A | 6/2010 |
| CN | 102025593 A | 4/2011 |
| CN | 102137133 A | 7/2011 |
| CN | 102143212 A | 8/2011 |
| CN | 102571947 A | 7/2012 |
| CN | 102752220 A | 10/2012 |
| CN | 102783099 A | 11/2012 |

(Continued)

*Primary Examiner* — Hong Cho

(74) *Attorney, Agent, or Firm* — Slater Matsil, LLP

(57) ABSTRACT

A network device executes a method including receiving a request message for a first service sent by a user equipment; determining a first service requested by the request message for the first service; and sending the request message for the first service to a first value added service server.

20 Claims, 4 Drawing Sheets

(56) References Cited

FOREIGN PATENT DOCUMENTS

| EP | 2512183 A1 | 10/2012 |
| EP | 2768196 A1 | 8/2014 |
| KR | 101010911 B1 | 1/2011 |
| WO | 2010049940 A1 | 5/2010 |
| WO | 2013170646 A1 | 11/2013 |

* cited by examiner

SERVICE PROCESSING METHOD AND NETWORK DEVICE

CROSS-REFERENCE TO RELATED APPLICATIONS

This application is a continuation of International Application No. PCT/CN2014/070897, filed on Jan. 20, 2014, which is hereby incorporated by reference in its entirety.

TECHNICAL FIELD

Embodiments relate to the field of communications technologies, and in particular embodiments, to a service processing method and a network device.

BACKGROUND

As mobile broadband networks develop, operators start to provide value added services for user equipments. For example, typical value added services include web image compression, web page resolution and layout optimization, video bit rate adjustment, and video data frame processing and the like. Different value added services are provided by different value added service servers (VAS). A value added service server provides a value added service for user equipment according to a request message for a service sent by the user equipment. For example, because some user equipments (for example, a mobile phone and a tablet computer) have small screens, a web page with a normal size applicable to a computer may not be applicable to these user equipments. A value added service server that provides the service of web page resolution and layout optimization may optimize the web page, so that an optimized web page is applicable to these user equipments with small screens. Specifically, when receiving a request message for a service, which is sent by user equipment with a small screen (for example, a mobile phone) and is used to request to open a web page, the value added service server that provides the service of web page resolution and layout optimization acts as a proxy of the user equipment to send the request message for the service used to request to open a web page to an Internet server, and receive service response information of the Internet server for the request message for the service, where the service response information includes the web page that the request message for the service requests to open. The value added service server that provides the service of web page resolution and layout optimization optimizes resolution and layout of the web page, so that an optimized web page is applicable to the user equipment. Then, the value added service server that provides the service of web page resolution and layout optimization packs the adjusted web page and sends it to the user equipment.

In the prior art, operators usually deploy N value added service servers in a network, where N is a natural number. The N value added service servers may provide different value added services for user equipments. If user equipment requests content from an Internet server, a request message for a service sent by the user equipment first passes through a traffic classifier. The traffic classifier may send the request message for the service sent by the user equipment to a preset value added service server among the N value added service servers. Specifically, in a case in which the request message for the service sent by the user equipment is received, the traffic classifier may send the request message for the service to the preset value added service server. For example, three value added service servers connected in series are successively a value added service server A, a value added service server B, and a value added service server C. The value added service server A is the preset value added service server configured to receive the request message for the service. Then, the value added service server that first receives the request message for the service is the value added service server A. The value added service server A needs to determine whether it is capable of providing a corresponding value added service for the request message for the service. If the value added service server A is not capable of providing the corresponding value added service for the request message for the service, the value added service server A forwards the request message for the service to a next value added service server, that is, the value added service server B, which is connected in series with the value added service server A. After receiving the request message for the service, if the value added service server B determines that it is not capable of providing the corresponding value added service for the request message for the service, the value added service server B continues to forward the request message for the service to a next value added service server, that is, the value added service server C, which is connected in series with the value added service server B. It is assumed that the value added service server C is the value added service server capable of providing the corresponding value added service for the request message for the service. Then, after receiving the request message for the service, the value added service server C determines that it is capable of providing the corresponding value added service for the request message for the service, and provides the value added service for the request message for the service. In this way, a service request sent by the user equipment may need to be successively determined by multiple value added service servers, and as a result, it is time-consuming to process the request message for the service sent by the user equipment.

SUMMARY

Embodiments provide a service processing method and a device, which help reduce time used for processing a service request sent by user equipment.

According to a first aspect, an embodiment provides a service processing method. The method is executed by a network device, and the method includes receiving a request message for a first service sent by user equipment, where the request message for the first service is used to request the first service. The method also includes determining the first service requested by the request message for the first service. The method further includes sending the request message for the first service to a first value added service server, where the first value added service server is configured to provide a value added service corresponding to the first service, and the network device pre-saves a correspondence between the first service and the first value added service server.

With reference to the first aspect, in a first possible implementation manner of the first aspect, before the receiving a request message for a first service sent by user equipment, the method further includes receiving a first handshake packet sent by the user equipment, where the first handshake packet is used to establish a first session, and the first session is used to transmit the first service. This implementation also includes sending the first handshake packet to first related value added service servers, where the first related value added service servers are all value added service servers corresponding to the first session.

With reference to the first possible implementation manner of the first aspect, in a second possible implementation manner of the first aspect, the method further includes receiving one or more first handshake response packets sent by one or more value added service servers among the first related value added service servers, where the first handshake response packets are used to respond to the first handshake packet. This implementation also includes forwarding, to the user equipment, one first handshake response packet among the first handshake response packets, which are sent by the one or more value added service servers among the first related value added service servers.

With reference to the first possible implementation manner of the first aspect, in a third possible implementation manner of the first aspect, before the receiving a request message for a first service sent by user equipment, the method further includes receiving and saving a first handshake packet sent by the user equipment, where the first handshake packet is used to establish a first session, and the first session is used to transmit the first service. This implementation also includes sending a first handshake response packet to the user equipment, where the first handshake response packet is used to respond to the first handshake packet; and before the sending the request message for the first service to a first value added service server, the method further includes: sending the first handshake packet to the first value added service server.

With reference to the first aspect, or the first possible implementation manner of the first aspect, or the second possible implementation manner of the first aspect, in a fourth possible implementation manner of the first aspect, the method further includes receiving a request message for a second service sent by the user equipment, where the request message for the second service is used to request the second service. This implementation also includes determining that the second service requested by the request message for the second service cannot be recognized. This implementation further includes sending the request message for the second service to second related value added service servers, where the second related value added service servers are all value added service servers corresponding to a session to which the request message for the second service belongs. This implementation additionally includes receiving a service response message sent by a second value added service server, where the service response message includes response information of the second service, and the second value added service server is any one value added service server among the second related value added service servers. This implementation also includes determining, according to the service response message, the second service requested by the request message for the second service.

With reference to the fourth possible implementation manner of the first aspect, in a fifth possible implementation manner of the first aspect, before the receiving a request message for a second service sent by the user equipment, the method further includes receiving a second handshake packet sent by the user equipment, where the second handshake packet is used to establish a second session, and the second session is used to transmit the second service. This implementation also includes sending the second handshake packet to the second related value added service servers.

With reference to the fifth possible implementation manner of the first aspect, in a sixth possible implementation manner of the first aspect, the method further includes receiving one or more second handshake response packets sent by one or more value added service servers among the second related value added service servers, where the second handshake response packets are used to respond to the second handshake packet. This implementation also includes forwarding, to the user equipment, one second handshake response packet among the second handshake response packets, which are sent by the one or more value added service servers among the second related value added service servers.

With reference to the third possible implementation manner of the first aspect, in a seventh possible implementation manner of the first aspect, the method further includes receiving a request message for a second service sent by the user equipment, where the request message for the second service is used to request the second service. This implementation also includes determining that the second service requested by the request message for the second service cannot be recognized. This implementation further includes sending the request message for the second service to an Internet server. This implementation additionally includes receiving a service response message sent by the Internet server, where the service response message includes response information of the second service. This implementation also includes determining, according to the service response message, the second service requested by the request message for the second service. This implementation also includes sending the request message for the second service to a third value added service server, where the third value added service server is configured to provide a value added service corresponding to the second service, and the network device pre-saves a correspondence between the second service and the third value added service server.

With reference to the seventh possible implementation manner of the first aspect, in an eighth possible implementation manner of the first aspect, before the receiving a request message for a second service sent by the user equipment, the method further includes. receiving and saving a second handshake packet sent by the user equipment, where the second handshake packet is used to establish a second session, and the second session is used to transmit the second service. This implementation also includes sending a second handshake response packet to the user equipment, where the second handshake response packet is used to respond to the second handshake packet. Before the sending the request message for the second service to a third value added service server, the method further includes: sending the second handshake packet to the third value added service server.

With reference to the eighth possible implementation manner of the first aspect, in a ninth possible implementation manner of the first aspect, before the sending the request message for the second service to an Internet server, the method further includes establishing a session with the Internet server according to the second handshake packet.

With reference to the ninth possible implementation manner of the first aspect, in a tenth possible implementation manner of the first aspect, after the determining the second service requested by the request message for the second service, the method further includes sending a session abort packet to the Internet server, where the session abort packet is used to terminate the session between the network device and the Internet server.

According to a second aspect, an embodiment provides a network device, where the network device includes a receiving unit configured to receive a request message for a first service sent by user equipment, where the request message for the first service is used to request the first service. The network device also includes a control unit configured to determine the first service requested by the request message for the first service. The network device further includes a sending unit configured to send the request message for the first service to a first value added service server, where the first value added service server is configured to provide a value added service corresponding to the first service. The network device additionally includes a storage unit, configured to save a correspondence between the first service and the first value added service server.

With reference to the second aspect, in a first possible implementation manner of the second aspect, the receiving unit is further configured to receive a first handshake packet sent by the user equipment before the receiving unit receives the request message for the first service sent by the user equipment, where the first handshake packet is used to establish a first session, and the first session is used to transmit the first service. In this implementation, the sending unit is further configured to send the first handshake packet to first related value added service servers, where the first related value added service servers are all value added service servers corresponding to the first session.

With reference to the first possible implementation manner of the second aspect, in a second possible implementation manner of the second aspect, the receiving unit is further configured to receive one or more first handshake response packets sent by one or more value added service servers among the first related value added service servers, where the first handshake response packets are used to respond to the first handshake packet. In this implementation, the sending unit is further configured to forward, to the user equipment, one first handshake response packet among the first handshake response packets, which are sent by the one or more value added service servers among the first related value added service servers.

With reference to the first possible implementation manner of the second aspect, in a third possible implementation manner of the second aspect, the receiving unit is further configured to: receive a first handshake packet sent by the user equipment before the receiving unit receives the request message for the first service sent by the user equipment, where the first handshake packet is used to establish a first session, and the first session is used to transmit the first service. In this implementation, the storage unit is further configured to save the first handshake packet. In this implementation, the sending unit is further configured to send a first handshake response packet to the user equipment, where the first handshake response packet is used to respond to the first handshake packet. The sending unit is further configured to send the first handshake packet to the first value added service server before sending the request message for the first service to the first value added service server.

With reference to the second aspect, or the first possible implementation manner of the second aspect, or the second possible implementation manner of the second aspect, in a fourth possible implementation manner of the second aspect, the receiving unit is further configured to receive a request message for a second service sent by the user equipment, where the request message for the second service is used to request the second service. In this implementation, the control unit is further configured to determine that the second service requested by the request message for the second service cannot be recognized. The sending unit is further configured to send the request message for the second service to second related value added service servers, where the second related value added service servers are all value added service servers corresponding to a session to which the request message for the second service belongs. In this implementation, the receiving unit is further configured to receive a service response message sent by a second value added service server, where the service response message includes response information of the second service, and the second value added service server is any one value added service server among the second related value added service servers. The control unit is further configured to determine, according to the service response message, the second service requested by the request message for the second service.

With reference to the fourth possible implementation manner of the second aspect, in a fifth possible implementation manner of the second aspect, the receiving unit is further configured to: receive a second handshake packet sent by the user equipment before the receiving unit receives the request message for the second service sent by the user equipment, where the second handshake packet is used to establish a second session, and the second session is used to transmit the second service. The sending unit is further configured to send the second handshake packet to the second related value added service servers.

With reference to the fifth possible implementation manner of the second aspect, in a sixth possible implementation manner of the second aspect, the receiving unit is further configured to receive one or more second handshake response packets sent by one or more value added service servers among the second related value added service servers, where the second handshake response packets are used to respond to the second handshake packet. In this implementation, the sending unit is further configured to forward, to the user equipment, one second handshake response packet among the second handshake response packets, which are sent by the one or more value added service servers among the second related value added service servers.

With reference to the third possible implementation manner of the second aspect, in a seventh possible implementation manner of the second aspect, the receiving unit is further configured to receive a request message for a second service sent by the user equipment, where the request message for the second service is used to request the second service. The control unit is further configured to determine that the second service requested by the request message for the second service cannot be recognized. The sending unit is further configured to send the request message for the second service to an Internet server. The receiving unit is further configured to receive a service response message sent by the Internet server, where the service response message includes response information of the second service. The control unit is further configured to determine, according to the service response message, the second service requested by the request message for the second service. The sending unit is further configured to send the request message for the second service to a third value added service server, where the third value added service server is configured to provide a value added service corresponding to the second service, and the network device pre-saves a correspondence between the second service and the third value added service server.

With reference to the seventh possible implementation manner of the second aspect, in an eighth possible implementation manner of the second aspect, the receiving unit is further configured to receive a second handshake packet sent by the user equipment before the receiving unit receives the request message for the second service sent by the user equipment, where the second handshake packet is used to establish a second session, and the second session is used to transmit the second service; the storage unit is further configured to save the second handshake packet. In this implementation, the sending unit is further configured to send a second handshake response packet to the user equipment, where the second handshake response packet is used to respond to the second handshake packet. The sending unit is further configured to: before sending the request message for the second service to the third value added service server, send the second handshake packet to the third value added service server.

With reference to the eighth possible implementation manner of the second aspect, in a ninth possible implementation manner of the second aspect, the control unit is further configured to establish a session with the Internet server according to the second handshake packet before the sending unit sends the request message for the second service to the Internet server.

With reference to the ninth possible implementation manner of the second aspect, in a tenth possible implementation manner of the second aspect, the sending unit is further configured to send a session abort packet to the Internet server, where the session abort packet is used to terminate the session between the network device and the Internet server after the control unit determines the second service requested by the request message for the second service.

According to the service processing method provided by the embodiments, in a case in which a service requested by a request message for the service is recognized, a network device may directly send the request message for the service to a specific value added service server configured to provide a value added service corresponding to the service. This can reduce a delay caused by processing of an unnecessary value added service server when a service request sent by user equipment is processed, and increase a processing speed of providing the value added service for the service.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments with reference to the accompanying drawings in the embodiments. Apparently, the described embodiments are merely a part rather than all of the embodiments. All other embodiments obtained by a person of ordinary skill in the art based on the embodiments without creative efforts shall fall within the protection scope of the present disclosure.

When user equipment requests a service from an Internet server, one or more messages may be involved. That is, the user equipment may send one or more messages to the Internet server, so as to request the Internet server to provide a corresponding service. In a process of requesting the Internet server to provide the service, a message sent by the user equipment to the Internet server is referred to as a request message for the service. A network device is located between the user equipment and the Internet server. Therefore the request message for the service sent by the user equipment to the Internet server is received by the network device. The network device may be a traffic classifier. A flow router (FR) is a type of traffic classifier. Request messages for services may be classified into two types described below.

A first type includes request messages for some services (for example, web video and web email). A network device can determine, a service requested by user equipment by inspecting, using a deep packet inspection (DPI) technology, a request message sent by the user equipment. These services, which can be directly recognized by using the DPI technology, are referred to as first services in the present disclosure. A message, which is sent by the user equipment and is used to request a first service, is referred to as a request message for the first service.

A second type includes request messages for some other services (for example, web browsing and http downloading). A network device cannot determine a service requested by user equipment by inspecting, using the DPI technology, a request message sent by the user equipment, but needs to determine the service requested by the user equipment according to a service response message sent by, for example, an Internet server. These services that need to be recognized by using a service response message are referred to as second services in the present disclosure. A message, which is sent by the user equipment and is used to request a second service, is referred to as a request message for the second service.

Further, both first services and second services in the specification refer to application layer services.

Figure 1:
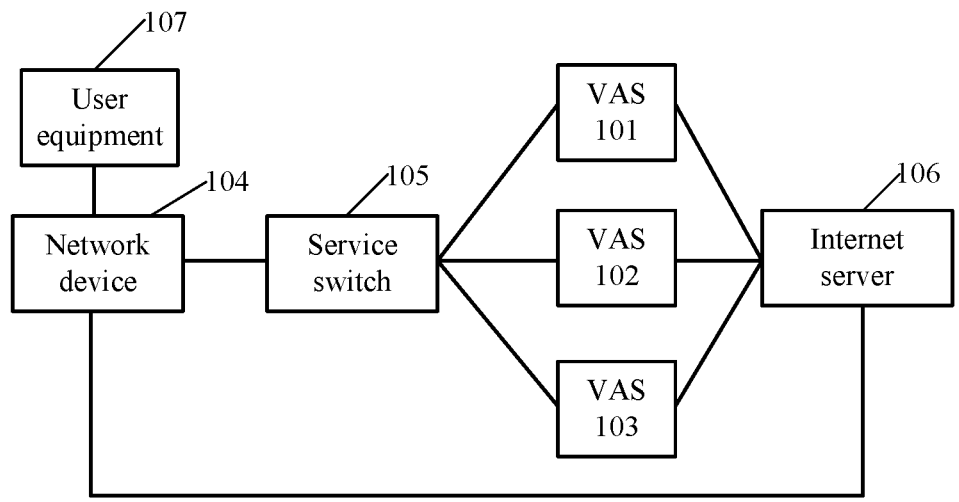
FIG. 1 is a schematic diagram of a network system.

FIG. 1 is a schematic diagram of a network system. The system shown in FIG. 1 includes three value added service servers, which are respectively a VAS 101, a VAS 102, and a VAS 103. The system shown in FIG. 1 further includes a network device 104, a service switch 105, and an Internet server 106. The network device 104 may communicate with user equipment 107. The network device 104 may further communicate with the VAS 101, VAS 102, and VAS 103. When communicating with the VAS 101, VAS 102, and VAS 103, the network device 104 needs to communicate with a corresponding value added service server by using the service switch 105. The network device 104 may further communicate with the Internet server 106.

It should be noted that, FIG. 1 is merely a schematic diagram of the network system, and lines shown in FIG. 1 merely represent that two devices can directly communicate with each other, and do not represent a connection relationship between the two devices.

Figure 2:
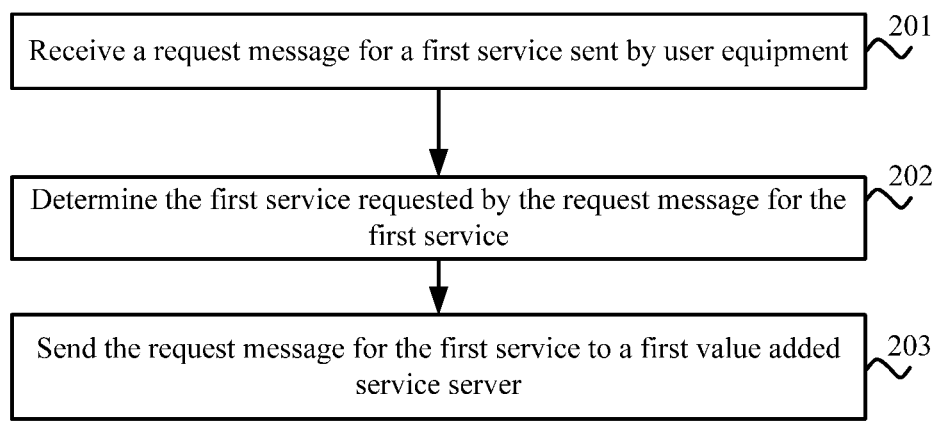
FIG. 2 is a schematic flowchart of a service processing method according to an embodiment.

FIG. 2 is a schematic flowchart of a service processing method according to an embodiment. The method shown in FIG. 2 may be executed by a network device, and the network device may be a traffic classifier. A flow router (FR) is a type of traffic classifier.

201: Receive a request message for a first service sent by user equipment, where the request message for the first service is used to request the first service.

202: Determine the first service requested by the request message for the first service.

203: Send the request message for the first service to a first value added service server, where the first value added service server is configured to provide a value added service corresponding to the first service, and the network device pre-saves a correspondence between the first service and the first value added service server.

According to the method shown in FIG. 2, when recognizing a service requested by a request message for the service, a network device may directly send the request message for the service to a value added service server configured to provide a value added service corresponding to the request message for the service. This can reduce a delay caused by processing of an unnecessary value added service server, and increase a processing speed of providing the value added service for the request message for the service.

Figure 3:
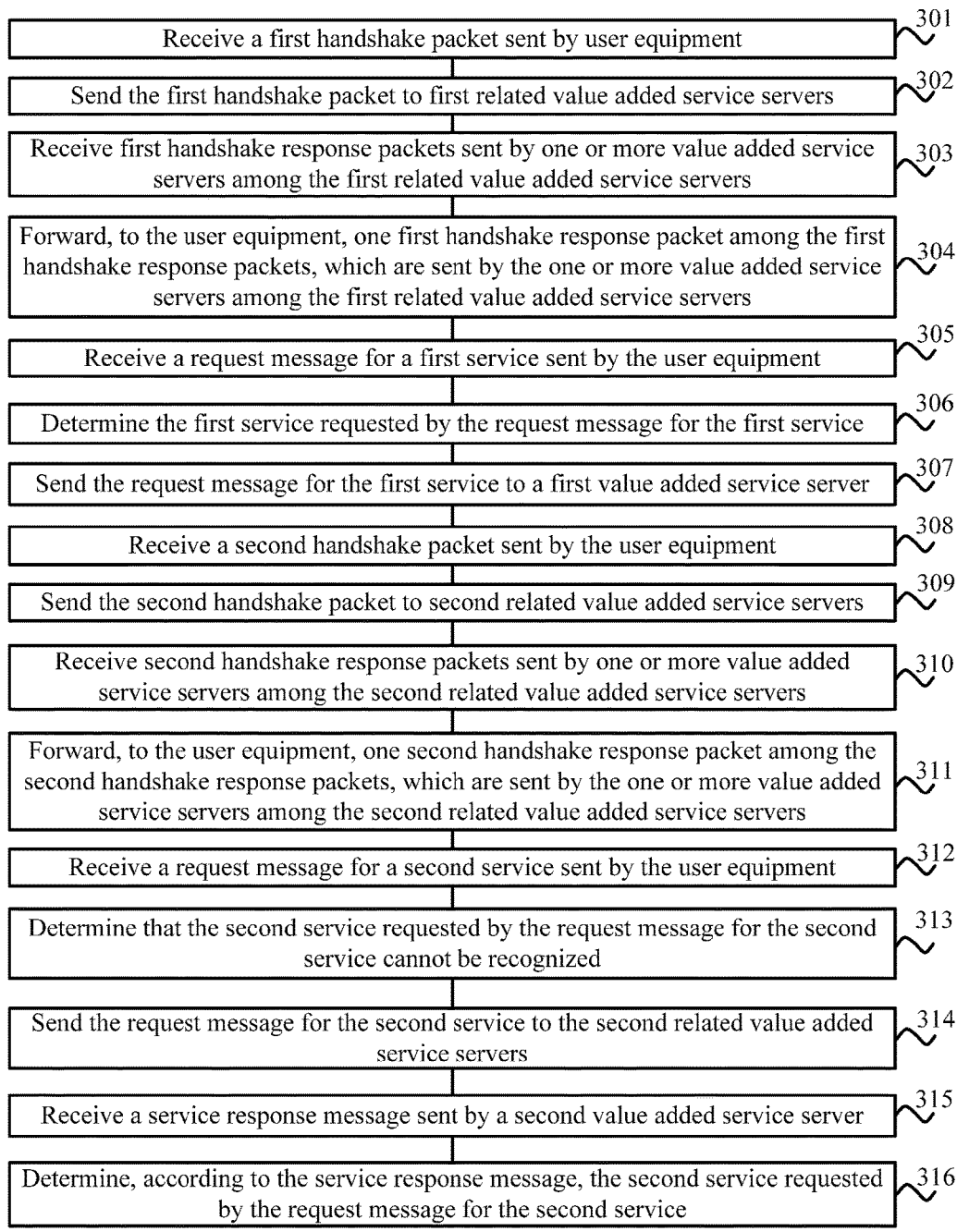
FIG. 3 is a schematic flowchart of a service processing method according to another embodiment.

FIG. 3 is a schematic flowchart of a service processing method according to another embodiment. The method shown in FIG. 3 may be executed by a network device, and the network device may be a traffic classifier.

Before sending a request message for a service to an Internet server, user equipment first needs to establish a session. Generally, different sessions correspond to different services. However, sometimes, one session may also correspond to multiple services, and service switchover occurs during the session. In this embodiment shown in FIG. 3, a first session may be used to transmit a first service, and a second session may be used to transmit a second service. Steps 301-307 describe a processing process of the network device after the network device receives a handshake packet for establishing the first session between the user equipment and the Internet server, and receives a request message for the first service, which is sent by the user equipment and corresponds to the first session. Steps 308-316 describe a processing process of the network device after the network device receives a handshake packet for establishing the second session between the user equipment and the Internet server, and receives a request message for the second service, which is sent by the user equipment and corresponds to the second session.

301: Receive a first handshake packet sent by the user equipment, where the first handshake packet is used to establish the first session.

The Transmission Control Protocol (TCP) is used as an example. The first handshake packet may correspond to a packet sent by the user equipment in a first step and a packet sent by the user equipment in a third step in a three-step handshake process for establishing a TCP session. That is, the user equipment sends a TCP synchronization (SYN) packet (that is, the packet sent by the user equipment in the first step) and an acknowledgment (ACK) packet (that is, the packet sent by the user equipment in the third step) to the Internet server.

302: Send the first handshake packet to first related value added service servers, where the first related value added service servers are all value added service servers corresponding to the first session.

There are multiple value added service servers in a system in which the network device is located. Although services processed by some value added service servers are different, different services processed by these value added service servers may have common characteristics. For example, the multiple value added service servers may process services with a same service port number. In this case, the network device may determine characteristic information of the first handshake packet, and determine the first related value added service servers according to the characteristic information. For example, the network device may determine the first related value added service servers according to quintuple information in the first handshake packet. Specifically, the characteristic information may be a destination port number carried in the first handshake packet, where the destination port number is used as a service port number for distinguishing a service. For example, the network device may determine that a destination port number of the handshake packet is 80. In this case, the handshake packet may be sent to all value added service servers corresponding to the service port number 80. These value added service servers are candidate value added service servers capable of processing a subsequent request message for a service. Therefore, when processing the request message for the service sent by the user equipment, these value added service servers may track a session of the user equipment by using the handshake packet. Specifically, a process that the network device sends the handshake packet to all value added service servers corresponding to the service port number 80 may be that: the network device marks a service chain ID of the first handshake packet with a special service chain ID. A mapping relationship between the special service chain ID and value added service servers is that, the special service chain ID corresponds to all value added service servers related to a port 80 in a value added service server group. That is, after receiving a packet marked with the special service chain ID, a service switch (SS) may send the packet to all the value added service servers related to the port 80 in the value added service server group. For example, the SS finds that there are three value added service servers related to the port 80, namely, value added service servers of web page optimization, web uniform resource locator (URL) filtering, and web cache. The SS replicates the packet to the three value added service servers.

For any one value added service server among the first related value added service servers, after receiving the handshake packet, the value added service server may start an application proxy function, to simulate an Internet server, and respond to the user equipment with a handshake response packet. The value added service server may further initiate a TCP session connection to the Internet server by using an Internet Protocol (IP) address of the value added service server or an IP address of the user equipment as a source address.

303: Receive one or more first handshake response packets sent by one or more value added service servers among the first related value added service servers, where the first handshake response packets are used to respond to the first handshake packet.

For example, the first handshake response packets may be TCP acknowledgment (ACK) packets. It should be understood that, for the TCP protocol, step 303 corresponds to a second step in a three-step handshake process for establishing a TCP session.

304: Forward, to the user equipment, one first handshake response packet among the first handshake response packets, which are sent by the one or more value added service servers among the first related value added service servers.

Handshake response packets returned by the first related value added service servers to the user equipment first reach the network device. The network device may select one handshake response packet from these handshake response packets and send the handshake response packet to the user equipment. For example, the network device may send a handshake response packet that first reaches the network device to the user equipment. Alternatively, the network device may further send, to the user equipment, a handshake response packet sent by a specific value added service server.

The user equipment interacts with the network device by using the first handshake packet. After establishment of the first session is complete, the user equipment sends a request message for a first service to the network device.

305: Receive a request message for a first service sent by the user equipment, where the request message for the first service is used to request the first service.

306: Determine the first service requested by the request message for the first service.

307: Send the request message for the first service to a first value added service server, where the first value added service server is configured to provide a value added service corresponding to the first service, and the network device pre-saves a correspondence between the first service and the first value added service server.

Specifically, after determining the service requested by the request message for the first service, the network device may mark the request message for the first service with a corresponding service chain identifier (ID). A service switch, which is responsible for message forwarding, may forward the request message for the first service to the first value added service server according to a correspondence between the service chain ID and the value added service server.

That is, if recognizing the service requested by the request message for the service, the network device may mark the request message for the service with a corresponding service chain ID, so as to accurately send the request message for the service to a value added service server capable of providing a value added service for the request message for the service.

In this way, corresponding to the request message for the first service, the network device can accurately send the request message for the first service to a value added service server capable of providing a value added service for the first service, thereby implementing accurate forwarding of the request message for the service.

It should be noted that, by using step 301 to step 304, the network device group-sends the handshake packet of the user equipment to the value added service servers corresponding to the first session, so that the corresponding value added service servers track a session of the user equipment during subsequent processing. A person skilled in the art may understand that, the handshake packet sent by the user equipment may also be group-sent to the corresponding value added service servers in another manner. In addition, in a process of establishing the session with the user equipment, it is possible that the handshake packet sent by the user equipment is received multiple times, and it is possible that the handshake response packet is sent to the user equipment multiple times. That is, it may be necessary that step 301 to step 304 are executed multiple times.

308: Receive a second handshake packet sent by the user equipment, where the second handshake packet is used to establish a second session.

309: Send the second handshake packet to second related value added service servers, where the second related value added service servers are all value added service servers corresponding to the second session.

310: Receive second handshake response packets sent by one or more value added service servers among the second related value added service servers, where the second handshake response packets are used to respond to the second handshake packet.

311: Forward, to the user equipment, one second handshake response packet among the second handshake response packets, which are sent by the one or more value added service servers among the second related value added service servers.

An execution process of the foregoing 308-311 is the same as that of the foregoing 301-304, and details are not described herein again.

The user equipment interacts with the network device by using the second handshake packet. After establishment of the second session is complete, the user equipment sends a request message for a second service to the network device.

312: Receive a request message for the second service sent by the user equipment, where the request message for the second service is used to request the second service.

313: Determine that the second service requested by the request message for the second service cannot be recognized.

314: Send the request message for the second service to the second related value added service servers, where the second related value added service servers are all value added service servers corresponding to a session to which the request message for the second service belongs. In other words, when the second session is used to transmit the second service, the second related value added service servers may be all value added service servers corresponding to the second session.

Specifically, if the network device encounters a request message for an unrecognizable service, a service chain ID of the request message for the service is marked as a special service chain ID. In this way, a switch, which is responsible for message forwarding, may replicate the request message for the service and marked with the special service chain ID to all candidate value added service servers capable of processing the request message. That is, if the network device encounters a request message for an unrecognizable service, the network device only needs to mark the request message for the service with a special service chain ID. In this way, work of the network device can be simplified significantly. In addition, all the candidate value added service servers including a value added service server capable of processing the request message for the service have obtained the handshake packet of the user equipment by using step 309, and the value added service server capable of processing the request message for the service may track a session of the user equipment by using the handshake packet.

315: Receive a service response message sent by a second value added service server, where the service response message includes response information of the second service, and the second value added service server is any one value added service server among the second related value added service servers.

In the foregoing 308-311, the second related value added service servers act as a proxy for the session between the user equipment and the Internet server. Therefore, the request message for the second service sent by the user equipment is sent to the Internet server by using the second related value added service servers, and then the service response message, which is returned by the Internet server and corresponds to the request message for the second service, is sent to the second related value added service servers, and is further sent to the network device. For example, after receiving, by using an application proxy, the service response message, which is sent by the Internet server and corresponds to the request message for the second service, a value added service server capable of processing the second service among the second related value added service servers may determine whether to use a corresponding value added service to process the service response message (for example, to compress an image). If it is determined that processing is needed, a processed service response message is sent to the network device.

316: Determine, according to the service response message, the second service requested by the request message for the second service.

After determining the second service, the network device may send the service response message to the user equipment. Further, the network device may further determine a third value added service server according to a correspondence, which is pre-saved by the network device, between the second service and the third value added service server, where the third value added service server is configured to provide a value added service corresponding to the second service.

By using step 308 to step 311, the network device sends the handshake packet, which is sent by the user equipment and is used to establish another session, to the value added service servers, so that the corresponding value added service servers track a session of the user equipment during subsequent processing. In addition, in a process of establishing the session with the user equipment, it is possible that the handshake packet sent by the user equipment is received multiple times. It is also possible that the handshake response packet is sent to the user equipment multiple times. That is, it may be necessary that step 308 to step 311 are executed multiple times.

A person skilled in the art may be aware that, sequence numbers of the steps in the embodiment shown in FIG. 3 do not limit a sequence of the steps. For example, the second session may be first established with the user equipment, and then the first session may be established with the user equipment.

In the embodiment shown in FIG. 3, the first session may be used to transmit the first service, and the second session may be used to transmit the second service. When requesting a service to the network device, the user equipment may send one request message for the service or send multiple request messages for the service. In a case in which the user equipment requests the first service by using multiple request messages for the service, the request message for the first service may be a first request message, for the first service, used to request the first service. Similarly, in a case in which the user equipment requests the second service by using multiple request messages for the service, the request message for the second service may be a first request message, for the second service, used to request the second service. For this case, after step 307 of the first session, if receiving a subsequent request message used to request the first service, the network device may determine, according to quintuple information carried in the subsequent request message, that the subsequent request message belongs to the first session. In this case, the network device directly sends the subsequent request message for the first service to the first value added service server without the need to perform DPI inspection for the subsequent request message. This simplifies processing of the network device and improves transmission efficiency of request messages for a service. Similarly, in step 316 of the second session, the network device may directly send a subsequent request message for the second service to the third value added service server without the need to perform DPI inspection for the received subsequent request message for the second service.

Optionally, there may also be a case in which one session corresponds to multiple services. That is, the user equipment requests multiple services in one session. In another embodiment, the first session includes the request message for the first service and the request message for the second service. It is assumed that there is only one request message for the first service, and there is also only one request message for the second service. The network device executes steps 301-307, skips steps 308-311 after 307, and executes 312, that is, receives the request message for the second service. In this case, there are two processing manners for the network device. A first processing manner is that, even if it is determined that both the request message for the first service and the request message for the second service belong to one session, a service determining action (corresponding to step 313) is still executed for the request message for the second service, and when it is determined that the service cannot be recognized, steps 314-316 are executed. In other words, after the user equipment establishes a session, the network device executes a service determining action for a request message for each service in the session. A second processing manner is that, steps 313-316 are skipped, and the request message for the second service is directly sent to the first value added service server in step 307.

According to the method shown in FIG. 3, for a first service, a network device can determine a service requested by user equipment by inspecting, by using a deep packet inspection (DPI) technology, a request message for the service sent by the user equipment. After determining the service requested by the request message for the service, the network device sends the request message for the service to a value added service server capable of processing the service, so that the value added service server provides a value added service for the request message for the service. For the first service, the network device may implement accurate forwarding of the request message for the first service. For a second service, the network device may determine, according to a service response message received from a value added service server, the service requested by the request message for the service, so as to help implement accurate forwarding of a subsequent request message for the second service. In short, when recognizing a service requested by a request message for the service, the network device may directly send the request message for the service to a specific value added service server configured to provide a value added service corresponding to the service. This can reduce a delay caused by processing of an unnecessary value added service server when a service request sent by user equipment is processed, and increase a processing speed of providing the value added service for the service.

Figure 4:
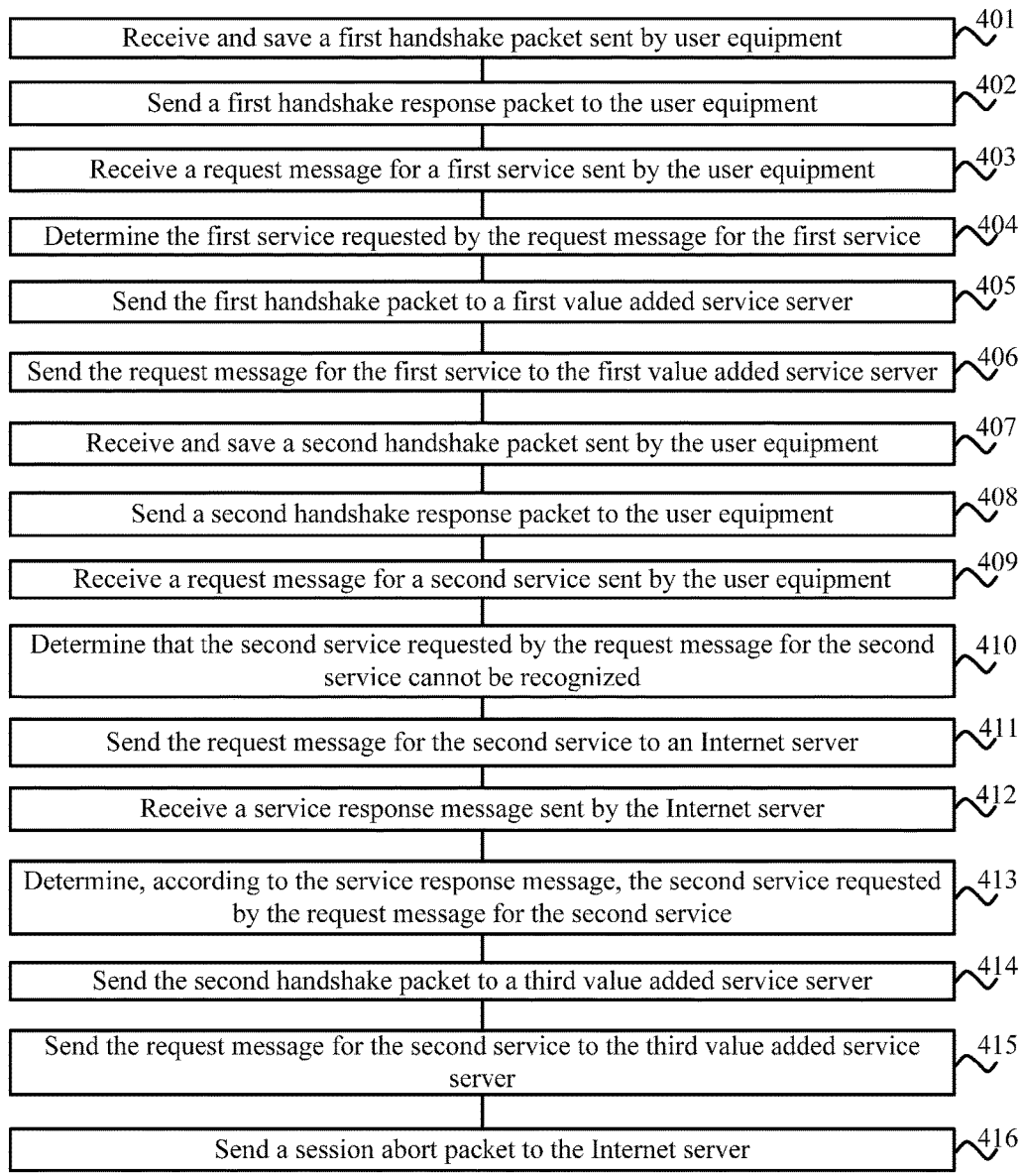
FIG. 4 is a schematic flowchart of a service processing method according to another embodiment.

FIG. 4 is a schematic flowchart of a service processing method according to another embodiment. The method shown in FIG. 4 may be executed by a network device, and the network device may be a traffic classifier.

Before sending a request message for a service to an Internet server, user equipment first needs to establish a session. Generally, different sessions correspond to different services. However, sometimes, one session may also correspond to multiple services, and service switchover occurs during the session. In this embodiment shown in FIG. 4, a first session may be used to transmit a first service, and a second session may be used to transmit a second service. Steps 401-406 describe a processing process of the network device after the network device receives a handshake packet for establishing the first session between the user equipment and the Internet server, and receives a request message for the first service, which is sent by the user equipment and corresponds to the first session. Steps 407-416 describe a processing process of the network device after the network device receives a handshake packet for establishing the second session between the user equipment and the Internet server, and receives a request message for the second service, which is sent by the user equipment and corresponds to the second session.

401: Receive and save a first handshake packet sent by the user equipment, where the first handshake packet is used to establish the first session.

TCP is used as an example. The first handshake packet may correspond to a packet sent by the user equipment in a first step and a packet sent by the user equipment in a third step in a three-step handshake process for establishing a TCP session. That is, the user equipment sends a TCP SYN packet (that is, the packet sent by the user equipment in the first step) and an ACK packet (that is, the packet sent by the user equipment in the third step) to the Internet server.

402: Send a first handshake response packet to the user equipment, where the first handshake response packet is used to respond to the first handshake packet.

For example, the first handshake response packet may be a TCP acknowledgment (ACK) packet. It should be understood that, for the TCP protocol, step 402 corresponds to a second step in a three-step handshake process for establishing a TCP session.

Optionally, as one embodiment, when receiving the first handshake packet, the network device may send the first handshake packet to the Internet server, and receive the first handshake response packet, which is sent by the Internet server and is used to respond to the first handshake packet. The network device sends the first handshake response packet to the user equipment.

Optionally, as another embodiment, when receiving the first handshake packet, the network device may send the first handshake response packet corresponding to the first handshake packet to the user equipment. In other words, in this case, the network device simulates the Internet server to generate one first handshake response packet, and sends the first handshake response packet to the user equipment.

The user equipment interacts with the network device by using the first handshake packet. After establishment of the first session is complete, the user equipment sends a request message for a first service to the network device.

403: Receive a request message for a first service sent by the user equipment, where the request message for the first service is used to request the first service.

404: Determine the first service requested by the request message for the first service.

405: Send the first handshake packet to a first value added service server, so that the first value added service server tracks a session status of the user equipment.

Step 401 and step 405 are a process of acquiring the first handshake packet and sending the first handshake packet to the corresponding value added service server, so that the value added service server tracks a session of the user equipment. A person skilled in the art may understand that, the handshake packet, which is sent by the user equipment and is used to establish a session, may also be sent to the corresponding value added service server in another manner. In addition, in a process of establishing the session with the user equipment, it is possible that the handshake packet sent by the user equipment is received multiple times, and it is possible that the handshake response packet is sent to the user equipment multiple times. That is, step 401 and step 402 may need to be executed multiple times.

406: Send the request message for the first service to the first value added service server, where the first value added service server is configured to provide a value added service corresponding to the first service, and the network device pre-saves a correspondence between the first service and the first value added service server.

The user equipment interacts with the network device by using a second handshake packet. After establishment of the second session is complete, the user equipment sends a request message for a second service to the network device.

407: Receive and save a second handshake packet sent by the user equipment, where the second handshake packet is used to establish the second session.

Refer to the foregoing 401, and details are not described herein again.

408: Send a second handshake response packet to the user equipment, where the second handshake response packet is used to respond to the second handshake packet.

Refer the foregoing 402, and details are not described herein again.

409: Receive a request message for a second service sent by the user equipment, where the request message for the second service is used to request the second service.

410: Determine that the second service requested by the request message for the second service cannot be recognized.

411: Send the request message for the second service to the Internet server.

Optionally, as one embodiment, in a case in which the second handshake response packet sent by the network device to the user equipment is a handshake response packet generated by the network device that simulates the Internet server, before sending the request message for the second service to the Internet server, the network device further establishes a session with the Internet server. The network device may establish the session with the Internet server according to the second handshake packet. Specifically, the network device may establish the session with the Internet server by using an address of the user equipment in the second handshake packet as a source address. Because the network device may act as a proxy of a massive number of user equipments to establish connections with Internet servers, if an address of the network device is used as the source address to establish connections with the Internet servers, some Internet servers may consider that the network device has initiated an attack. Therefore, a transparent proxy manner may be used, in which the address of the user equipment is used as the source address to establish the session with the Internet server.

412: Receive a service response message sent by the Internet server, where the service response message includes response information of the second service.

413: Determine, according to the service response message, the second service requested by the request message for the second service.

414: Send the second handshake packet to a third value added service server, where the third value added service server is configured to provide a value added service corresponding to the second service, and the network device pre-saves a correspondence between the second service and the third value added service server.

Step 407 and step 414 are a process of acquiring the second handshake packet and sending the second handshake packet to the corresponding value added service server, so that the corresponding value added service server tracks a session of the user equipment. A person skilled in the art may understand that, the handshake packet, which is sent by the user equipment and is used to establish a session, may also be sent to the corresponding value added service server in another manner. In addition, in a process of establishing the session with the user equipment, it is possible that the handshake packet sent by the user equipment is received multiple times, and it is possible that the handshake response packet is sent to the user equipment multiple times. That is, step 407 and step 408 may need to be executed multiple times.

415: Send the request message for the second service to the third value added service server.

Further, step 416 may further be included, and step 416 may be executed after the second service requested by the request message for the second service is determined, that is, executed after step 413.

416: Send a session abort packet to the Internet server, where the session abort packet is used to terminate the session with the Internet server. In this way, a port resource of the Internet server may be released to avoid denial of service (DoS) of the server caused by a suspended session.

For example, the session abort packet may be a TCP reset (RST).

A person skilled in the art may be aware that, sequence numbers of the steps in this embodiment shown in FIG. 4 do not limit a sequence of the steps. For example, the first session may be first established with the user equipment, and then the second session may be established with the user equipment.

In this embodiment shown in FIG. 4, the first session may be used to transmit the first service, and the second session may be used to transmit the second service. When requesting a service to the network device, the user equipment may send one request message for the service or send multiple request messages for the service. In a case in which the user equipment requests the first service by using multiple request messages for the service, the request message for the first service may be a first request message, for the first service, used to request the first service. Similarly, in a case in which the user equipment requests the second service by using multiple request messages for the service, the request message for the second service may be a first request message, for the second service, used to request the second service. For this case, after step 406 of the first session, if the network device receives a subsequent request message used to request the first service, it may be determined, according to quintuple information carried in the subsequent request message, that the subsequent request message belongs to the first session. In this case, the network device directly sends the subsequent request message for the first service to the first value added service server without the need to perform DPI inspection for the subsequent request message, which simplifies processing of the network device and improves transmission efficiency of request messages for a service. Similarly, after step 409 of the second session, the network device may directly send a subsequent request message for the second service to the third value added service server without the need to perform DPI inspection for the received subsequent request message for the second service.

Optionally, there may also be a case in which one session corresponds to multiple services. That is, the user equipment requests multiple services in one session. In another embodiment, the first session includes the request message for the first service and the request message for the second service. It is assumed that there is only one request message used to request the first service, and there is also only one request message used to request the second service. The network device executes steps 401-406, skips step 407 and step 408 after 406, and executes 409, that is, receives the request message for the second service. In this case, there are two processing manners for the network device. A first processing manner is that even if it is determined that both a first service request and a second service request belong to one session, a service determining action (corresponding to step 410) is still executed for the request message for the second service, and when it is determined that the service cannot be recognized, steps 411-413 are executed. In other words, after the user equipment establishes a session, the network device executes a service determining action for a request message for each service in the session. A second processing manner is that steps 410-415 are skipped, and the request message for the second service is directly sent to the first value added service server in step 405.

According to the method shown in FIG. 4, for a first service, a network device can determine a service requested by user equipment by inspecting, by using a deep packet inspection (DPI) technology, a request message for the service sent by the user equipment. After determining the service requested by the request message for the service, the network device sends the request message for the service to a value added service server capable of processing the service, so that the value added service server provides the request message for the service with a value added service. For the first service, the network device may implement accurate forwarding of the request message for the first service. For a second service, the network device may determine, according to a service response message received from an Internet server, a service requested by the request message for the service, thereby implementing accurate forwarding of the request message for the service. In short, when recognizing a service requested by a request message for the service, the network device may directly send the request message for the service to a specific value added service server configured to provide a value added service corresponding to the service. This can reduce a delay caused by processing of an unnecessary value added service server when a service request sent by user equipment is processed, and increase a processing speed of providing the service with the value added service.

Figure 5:
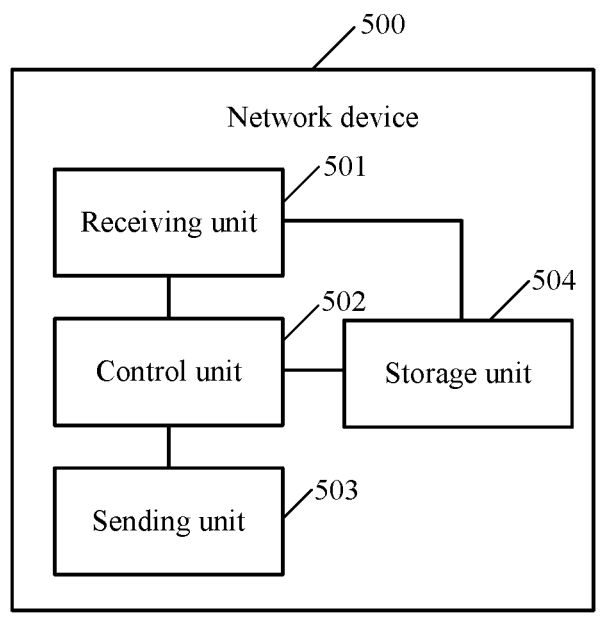
FIG. 5 is a structural block diagram of a network device according to an embodiment.

FIG. 5 is a structural block diagram of a network device according to an embodiment. A network device 500 shown in FIG. 5 includes a receiving unit 501, a control unit 502, a sending unit 503, and a storage unit 504.

The receiving unit 501 is configured to receive a request message for a first service sent by user equipment, where the request message for the first service is used to request the first service.

The control unit 502 is configured to determine the first service requested by the request message for the first service.

The sending unit 503 is configured to send the request message for the first service to a first value added service server, where the first value added service server is configured to provide a value added service corresponding to the first service.

The storage unit 504 is configured to save a correspondence between the first service and the first value added service server.

The network device 500 shown in FIG. 5 can determine a service requested by the user equipment by inspecting, by using a DPI technology, a request message for the service sent by the user equipment. After determining the service requested by the request message for the service, the network device 500 sends the request message for the service to a value added service server capable of processing the service, so that the value added service server provides a value added service for the request message for the service. For the first service, the network device may implement accurate forwarding of the request message for the first service. This can reduce a delay caused by processing of an unnecessary value added service server when a service request sent by user equipment is processed, and increase a processing speed of providing the service with the value added service.

Optionally, the receiving unit 501 is further configured to receive a first handshake packet sent by the user equipment before the receiving unit 501 receives the request message for the first service sent by the user equipment, where the first handshake packet is used to establish a first session, and the first session is used to transmit the first service. The sending unit 503 is further configured to send the first handshake packet to first related value added service servers, where the first related value added service servers are all value added service servers corresponding to the first session. Further, the receiving unit 501 is further configured to receive one or more first handshake response packets sent by one or more value added service servers among the first related value added service servers, where the first handshake response packets are used to respond to the first handshake packet. The sending unit 503 is further configured to forward, to the user equipment, one first handshake response packet among the first handshake response packets, which are sent by the one or more value added service servers among the first related value added service servers.

Optionally, the receiving unit 501 is further configured to: before the receiving unit 501 receives the request message for the first service sent by the user equipment, receive a first handshake packet sent by the user equipment, where the first handshake packet is used to establish a first session, and the first session is used to transmit the first service. The storage unit 504 is further configured to save the first handshake packet sent by the user equipment. The sending unit 503 is further configured to send a first handshake response packet to the user equipment, where the first handshake response packet is used to respond to the first handshake packet. The sending unit 503 is further configured to: before sending the request message for the first service to the first value added service server, send the first handshake packet to the first value added service server.

Optionally, as one embodiment, the receiving unit 501 is further configured to receive a request message for a second service sent by the user equipment, where the request message for the second service is used to request the second service. The control unit 502 is further configured to determine that the second service requested by the request message for the second service cannot be recognized. The sending unit 503 is further configured to send the request message for the second service to second related value added service servers, where the second related value added service servers are all value added service servers corresponding to a session to which the request message for the second service belongs. The receiving unit 501 is further configured to receive a service response message sent by a second value added service server, where the service response message includes response information of the second service, and the second value added service server is any one value added service server among the second related value added service servers. The control unit 502 is further configured to determine, according to the service response message, the second service requested by the request message for the second service. In this way, if the network device encounters a request message for an unrecognizable service, a service chain ID of the request message for the service is marked as a special service chain ID. In this way, a switch, which is responsible for message forwarding, may replicate the request message for the service and marked with the special service chain ID to all candidate value added service servers capable of processing the request message. That is, if the network device encounters a request message for an unrecognizable service, the network device only needs to mark the request message for the service with a special service chain ID. In this way, work of the network device can be simplified significantly. In addition, accurate forwarding of the request message for the service can reduce a delay caused by processing of an unnecessary value added service server, and increase a processing speed of providing the request message for the service with a value added service. In addition, all the candidate value added service servers including a value added service server capable of processing the request message for the service have obtained the handshake packet of the user equipment, and the value added service server capable of processing the request message for the service may track a session of the user equipment by using the handshake packet.

Optionally, the receiving unit 501 is further configured to receive a second handshake packet sent by the user equipment before the receiving unit 501 receives the request message for the second service sent by the user equipment, where the second handshake packet is used to establish a second session, and the second session is used to transmit the second service. The sending unit 503 is further configured to send the second handshake packet to the second related value added service servers. Further, the receiving unit 501 is further configured to receive second handshake response packets sent by one or more value added service servers among the second related value added service servers, where the second handshake response packets are used to respond to the second handshake packet. The sending unit 503 is further configured to forward, to the user equipment, one second handshake response packet among the second handshake response packets, which are sent by the one or more value added service servers among the second related value added service servers.

Optionally, as another embodiment, the receiving unit 501 is further configured to receive a request message for a second service sent by the user equipment, where the request message for the second service is used to request the second service. The control unit 502 is further configured to determine that the second service requested by the request message for the second service cannot be recognized. The sending unit 503 is further configured to send the request message for the second service to an Internet server. The receiving unit 501 is further configured to receive a service response message sent by the Internet server, where the service response message includes response information of the second service. The control unit 502 is further configured to determine, according to the service response message, the second service requested by the request message for the second service. The sending unit 503 is further configured to send the request message for the second service to a third value added service server, where the third value added service server is configured to provide a value added service corresponding to the second service, and the network device pre-saves a correspondence between the second service and the third value added service server. In this way, for the second service, the network device may determine, according to a service response message received from a value added service server, the service requested by the request message for the service, thereby implementing accurate forwarding of the request message for the service. This can reduce a delay caused by processing of an unnecessary value added service server, and increase a processing speed of providing the request message for the service with a value added service.

Optionally, the receiving unit 501 is further configured to receive a second handshake packet sent by the user equipment before the receiving unit 501 receives the request message for the second service sent by the user equipment, where the second handshake packet is used to establish a second session, and the second session is used to transmit the second service. The storage unit 504 is further configured to save the second handshake packet. The sending unit 503 is further configured to send a second handshake response packet to the user equipment, where the second handshake response packet is used to respond to the second handshake packet. The sending unit 503 is further configured to send the second handshake packet to the third value added service server before sending the request message for the second service to the third value added service server.

Optionally, the control unit 502 is further configured to establish a session with the Internet server according to the second handshake packet before the sending unit 503 sends the request message for the second service to the Internet server. Further, the sending unit 503 is further configured to send a session abort packet to the Internet server, where the session abort packet is used to terminate the session between the network device and the Internet server after the control unit 502 determines the second service requested by the request message for the second service.

Figure 6:
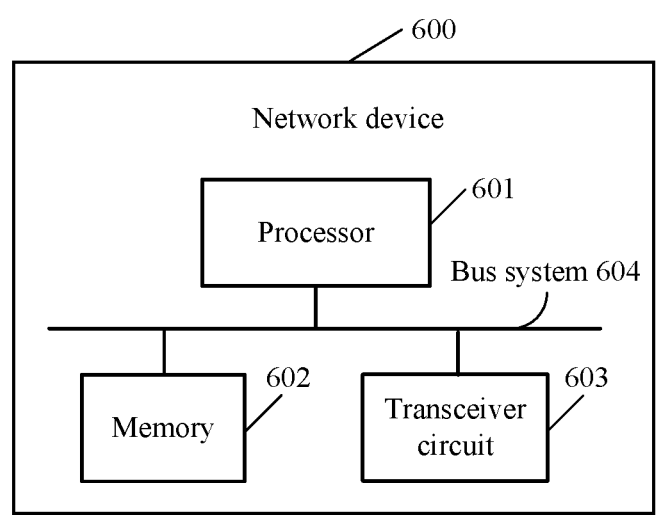
FIG. 6 is a structural block diagram of a network device according to an embodiment.

FIG. 6 is a structural block diagram of a network device according to an embodiment. A network device 600 shown in FIG. 6 includes a processor 601, a memory 602, and a transceiver circuit 603.

Components of the network device 600 are coupled together by using a bus system 604, where the bus system 604 further includes a power bus, a control bus, and a status signal bus in addition to a data bus. However, for clear description, all types of buses in FIG. 6 are marked as the bus system 604.

The methods disclosed in the foregoing embodiments may be applied to the processor 601, or be implemented by the processor 601. The processor 601 may be a type of integrated circuit chip and has a signal processing capability. In an implementation process, steps of the foregoing methods may be executed by an integrated logic circuit of hardware in the processor 601 or by means of instructions in a software form. The foregoing processor 601 may be a general processor, a digital signal processor (DSP), an application specific integrated circuit (ASIC), a field programmable gate array (FPGA) or another programmable logic device, a discrete gate or transistor logic device, or a discrete hardware component, and can implement or execute the methods, steps, and logical block diagrams disclosed in the embodiments. The general processor may be a microprocessor, or the processor may also be any regular processor. The steps of the methods disclosed with reference to the embodiments may be directly embodied as being executed by a hardware decoding processor, or being executed by a combination of hardware and software modules in a decoding processor. The software module may be located in a mature storage medium in the field, such as a random access memory (RAM), a flash memory, a read-only memory (ROM), a programmable read-only memory, an electrically erasable programmable memory, or a register. The storage medium is located in the memory 602, and the processor 601 reads an instruction in the memory 602, and executes the steps of the foregoing methods in combination with the hardware of the processor 601.

The transceiver circuit 603 is configured to receive a request message for a first service sent by user equipment, where the request message for the first service is used to request the first service.

The processor 601 is configured to execute the instruction, which is used to determine the first service requested by the request message for the first service.

The transceiver circuit 603 is configured to send the request message for the first service to a first value added service server, where the first value added service server is configured to provide a value added service corresponding to the first service.

The memory 602 is configured to save a correspondence between the first service and the first value added service server.

The network device 600 shown in FIG. 6 can determine a service requested by the user equipment by inspecting, by using a DPI technology, a request message for the service sent by the user equipment. After determining the service requested by the request message for the service, the network device 600 sends the request message for the service to a value added service server capable of processing the service, so that the value added service server provides a value added service for the request message for the service. For the first service, the network device may implement accurate forwarding of the message for the first service. This can reduce a delay caused by processing of an unnecessary value added service server when a service request sent by user equipment is processed, and increase a processing speed of providing the service with the value added service.

Optionally, the transceiver circuit 603 is further configured to receive a first handshake packet sent by the user equipment before the transceiver circuit 603 receives the request message for the first service sent by the user equipment, where the first handshake packet is used to establish a first session, and the first session is used to transmit the first service. The transceiver circuit 603 is further configured to send the first handshake packet to first related value added service servers, where the first related value added service servers are all value added service servers corresponding to the first session. Further, the transceiver circuit 603 is further configured to receive one or more first handshake response packets sent by one or more value added service servers among the first related value added service servers, where the first handshake response packets are used to respond to the first handshake packet. The transceiver circuit 603 is further configured to forward, to the user equipment, one first handshake response packet among the first handshake response packets, which are sent by the one or more value added service servers among the first related value added service servers.

Optionally, the transceiver circuit 603 is further configured to receive a first handshake packet sent by the user equipment before the transceiver circuit 603 receives the request message for the first service sent by the user equipment, where the first handshake packet is used to establish a first session, and the first session is used to transmit the first service. The memory 602 is further configured to save the first handshake packet. The transceiver circuit 603 is further configured to send a first handshake response packet to the user equipment, where the first handshake response packet is used to respond to the first handshake packet. The transceiver circuit 603 is further configured to send the first handshake packet to the first value added service server before sending the request message for the first service to the first value added service server.

Optionally, as one embodiment, the transceiver circuit 603 is further configured to receive a request message for a second service sent by the user equipment, where the request message for the second service is used to request the second service. The processor 601 is further configured to execute the instruction, which is used to determine that the second service requested by the request message for the second service cannot be recognized. The transceiver circuit 603 is further configured to send the request message for the second service to second related value added service servers, where the second related value added service servers are all value added service servers corresponding to a session to which the request message for the second service belongs. The transceiver circuit 603 is further configured to receive a service response message sent by a second value added service server, where the service response message includes response information of the second service, and the second value added service server is any one value added service server among the second related value added service servers. The processor 601 is further configured to execute the instruction, which is used to determine, according to the service response message, the second service requested by the request message for the second service. In this way, if the network device encounters a request message for an unrecognizable service, a service chain ID of the request message for the service is marked as a special service chain ID. In this way, a switch, which is responsible for message forwarding, may replicate the request message for the service and marked with the special service chain ID to all candidate value added service servers capable of processing the request message. That is, if the network device encounters a request message for an unrecognizable service, the network device only needs to mark the request message for the service with a special service chain ID. In this way, work of the network device can be simplified significantly. In addition, accurate forwarding of the request message for the service can reduce a delay caused by processing of an unnecessary value added service server, and increase a processing speed of providing the request message for the service with a value added service. In addition, all the candidate value added service servers including a value added service server capable of processing the request message for the service have obtained the handshake packet of the user equipment, and the value added service server capable of processing the request message for the service may track a session of the user equipment by using the handshake packet.

Optionally, the transceiver circuit 603 is further configured to receive a second handshake packet sent by the user equipment before the transceiver circuit 603 receives the request message for the second service sent by the user equipment, where the second handshake packet is used to establish a second session, and the second session is used to transmit the second service. The transceiver circuit 603 is further configured to send the second handshake packet to the second related value added service servers. Further, the transceiver circuit 603 is further configured to receive second handshake response packets sent by one or more value added service servers among the second related value added service servers, where the second handshake response packets are used to respond to the second handshake packet. The transceiver circuit 603 is further configured to forward, to the user equipment, one second handshake response packet among the second handshake response packets, which are sent by the one or more value added service servers among the second related value added service servers.

Optionally, as another embodiment, the transceiver circuit 603 is further configured to receive a request message for a second service sent by the user equipment, where the request message for the second service is used to request the second service. The processor 601 is further configured to execute the instruction, which is used to determine that the second service requested by the request message for the second service cannot be recognized. The transceiver circuit 603 is further configured to send the request message for the second service to an Internet server. The transceiver circuit 603 is further configured to receive a service response message sent by the Internet server, where the service response message includes response information of the second service. The processor 601 is further configured to execute the instruction, which is used to determine, according to the service response message, the second service requested by the request message for the second service. The transceiver circuit 603 is further configured to send the request message for the second service to a third value added service server, where the third value added service server is configured to provide a value added service corresponding to the second service, and the network device pre-saves a correspondence between the second service and the third value added service server. In this way, for the second service, the network device may determine, according to a service response message received from a value added service server, the service requested by the request message for the service, thereby implementing accurate forwarding of the request message for the service. This can reduce a delay caused by processing of an unnecessary value added service server, and increase a processing speed of providing the request message for the service with a value added service.

Optionally, the transceiver circuit 603 is further configured to receive a second handshake packet sent by the user equipment before the transceiver circuit 603 receives the request message for the second service sent by the user equipment, where the second handshake packet is used to establish a second session, and the second session is used to transmit the second service. The memory 602 is further configured to save the second handshake packet. The transceiver circuit 603 is further configured to send a second handshake response packet to the user equipment, where the second handshake response packet is used to respond to the second handshake packet. The transceiver circuit 603 is further configured to send the second handshake packet to the third value added service server before sending the request message for the second service to the third value added service server.

Optionally, the processor 601 is further configured to execute the instruction, which is used to establish a session with the Internet server according to the second handshake packet before the transceiver circuit 603 sends the request message for the second service to the Internet server. Further, the transceiver circuit 603 is further configured to: after the processor 601 determines the second service requested by the request message for the second service, send a session abort packet to the Internet server, where the session abort packet is used to terminate the session between the network device and the Internet server.

A person of ordinary skill in the art may be aware that, units and algorithm steps described with reference to the examples described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be saved in a computer-readable savage medium. Based on such an understanding, the technical solutions of the present disclosure essentially, or the part contributing to the prior art, or a part of the technical solutions may be implemented in a form of a software product. The software product is saved in a savage medium and includes several instructions for instructing a computer device (which may be a personal computer, a server, or a network device) or a processor to perform all or a part of the steps of the methods described in the embodiments. The foregoing savage medium includes: any medium that can save program code, such as a USB flash drive, a removable hard disk, a read-only memory (ROM), a random access memory (RAM), a magnetic disk, or an optical disc.

The foregoing descriptions are merely specific embodiments, but are not intended to limit the protection scope of the present disclosure. Any variation or replacement readily figured out by a person skilled in the art within the technical scope disclosed herein shall fall within the protection scope of the present disclosure. Therefore, the protection scope of the present disclosure shall be subject to the protection scope of the claims.

What is claimed is:

1. A method, executed by a network device, comprising:
receiving a first handshake packet sent by a user equipment, wherein the first handshake packet is used to establish a first session, and wherein the first session is used to transmit a first service;
sending the first handshake packet to a plurality of first related value added service servers, wherein the plurality of first related value added service servers are a plurality of value added service servers corresponding to the first service;
receiving a request message for a first service sent by the user equipment, wherein the request message for the first service is used to request the first service;
determining the first service requested by the request message for the first service; and
sending the request message for the first service, according to a pre-saved correspondence between the first service and a first value added service server, to the first value added service server that is, from the plurality of first related value added service servers, configured to provide a value added service corresponding to the first service.

2. The method according to claim 1, further comprising:
receiving a first handshake response packet sent by a value added service server of the first related value added service servers, wherein the first handshake response packet is used to respond to the first handshake packet; and
forwarding, to the user equipment, the first handshake response packet.

3. The method according to claim 1, further comprising:
receiving a request message for a second service sent by the user equipment, wherein the request message for the second service is used to request the second service;
determining that the second service requested by the request message for the second service cannot be recognized;
sending the request message for the second service to second related value added service servers, wherein the second related value added service servers are value added service servers corresponding to a session to which the request message for the second service belongs;
receiving a service response message sent by a second value added service server, wherein the service response message comprises response information of the second service, and wherein the second value added service server is a value added service server of the second related value added service servers; and
determining, according to the service response message, the second service requested by the request message for the second service.

4. The method according to claim 3, further comprising:
receiving a second handshake packet sent by the user equipment, wherein the second handshake packet is used to establish a second session, and wherein the second session is used to transmit the second service; and
sending the second handshake packet to the second related value added service servers.

5. The method according to claim 4, further comprising:
receiving a second handshake response packet sent by a value added service server of the second related value added service servers, wherein the second handshake response packet is used to respond to the second handshake packet; and
forwarding, to the user equipment, the second handshake response packet.

6. The method according to claim 4, further comprising:
receiving a request message for a second service sent by the user equipment, wherein the request message for the second service is used to request the second service;
determining that the second service requested by the request message for the second service cannot be recognized;
sending the request message for the second service to an Internet server;
receiving a service response message sent by the Internet server, wherein the service response message comprises response information of the second service;
determining, according to the service response message, the second service requested by the request message for the second service; and
sending the request message for the second service, according to a pre-saved correspondence between the second service and a third value added service server, to the third value added service server that is configured to provide a value added service corresponding to the second service.

7. The method according to claim 6, further comprising:
receiving and saving a second handshake packet sent by the user equipment, wherein the second handshake packet is used to establish a second session, and wherein the second session is used to transmit the second service; and
sending a second handshake response packet to the user equipment, wherein the second handshake response packet is used to respond to the second handshake packet; and
sending the second handshake packet to the third value added service server.

8. The method according to claim 7, further comprising:
establishing a session with the Internet server according to the second handshake packet.

9. The method according to claim 8, further comprising:
sending a session abort packet to the Internet server, wherein the session abort packet is used to terminate the session between the network device and the Internet server.

10. The method according to claim 1, wherein the first service corresponds to a plurality of value added services, and the value added service is one of the plurality of value added services.

11. The method according to claim 10, wherein the plurality of value added services comprise a plurality of content processing services for content to be transmitted to the user equipment.

12. The method according to claim 11, wherein the plurality of content processing services comprise web image compression, web page resolution, layout optimization, video bit rate adjustment, video data frame processing, and other content output adjustment services.

13. A network device, comprising:
a processor; and
a non-transitory computer-readable medium storing program modules executable by the processor, the program modules including:
a receiving module configured to receive a first handshake packet sent by a user equipment, wherein the first handshake packet is used to establish a first session, and wherein the first session is used to transmit a first service; and
a sending module configured to send the first handshake packet to a plurality of first related value added service servers, wherein the plurality of first related value added service servers are a plurality of value added service servers corresponding to the first service;
wherein the receiving module is further configured to receive a request message for the first service sent by the user equipment, wherein the request message for the first service is used to request the first service;
wherein the network device further comprises a control module configured to determine the first service requested by the request message for the first service; and
wherein the sending module is further configured to send the request message for the first service, according to a pre-saved correspondence between the first service and a first value added service server, to the first value added service server that is, from the plurality of first related value added service servers, configured to provide a value added service corresponding to the first service.

14. The network device according to claim 13, wherein:
the receiving module is further configured to receive a first handshake response packet sent by a value added service server of the first related value added service servers, wherein the first handshake response packet is used to respond to the first handshake packet; and
the sending module is further configured to forward, to the user equipment, the first handshake response packet.

15. The network device according to claim 13, wherein:
the receiving module is further configured to receive a request message for a second service sent by the user equipment, wherein the request message for the second service is used to request the second service;
the control module is further configured to determine that the second service requested by the request message for the second service cannot be recognized;
the sending module is further configured to send the request message for the second service to second related value added service servers, wherein the second related value added service servers are value added service servers corresponding to a session to which the request message for the second service belongs;
the receiving module is further configured to receive a service response message sent by a second value added service server, wherein the service response message comprises response information of the second service, and wherein the second value added service server is any one value added service server of the second related value added service servers; and
the control module is further configured to determine, according to the service response message, the second service requested by the request message for the second service.

16. The network device according to claim 15, wherein:
the receiving module is further configured to receive a second handshake packet sent by the user equipment, wherein the second handshake packet is used to establish a second session, and wherein the second session is used to transmit the second service; and
the sending module is further configured to send the second handshake packet to the second related value added service servers.

17. The network device according to claim 16, wherein:
the receiving module is further configured to receive a second handshake response packet sent by a value added service server of the second related value added service servers, wherein the second handshake response packet is used to respond to the second handshake packet; and the sending module is further configured to forward, to the user equipment, the second handshake response packet.

18. The network device according to claim 13, wherein:
the receiving module is further configured to receive a request message for a second service sent by the user equipment, wherein the request message for the second service is used to request the second service;

the control module is further configured to determine that the second service requested by the request message for the second service cannot be recognized;

the sending module is further configured to send the request message for the second service to an Internet server;

the receiving module is further configured to receive a service response message sent by the Internet server, wherein the service response message comprises response information of the second service;

the control module is further configured to determine, according to the service response message, the second service requested by the request message for the second service; and the sending module is further configured to send the request message for the second service, according to a pre-saved correspondence between the second service and a third value added service server, to the third value added service server that is configured to provide a value added service corresponding to the second service.

19. The network device according to claim 18, wherein:
the receiving module is further configured to receive a second handshake packet sent by the user equipment, wherein the second handshake packet is used to establish a second session, and wherein the second session is used to transmit the second service;

the sending module is further configured to send a second handshake response packet to the user equipment, wherein the second handshake response packet is used to respond to the second handshake packet; and the sending module is further configured to send the second handshake packet to the third value added service server.

20. A network device comprising:
a processor; and
a non-transitory computer-readable storage medium storing a program to be executed by the processor, the program including instructions for:
receiving a first handshake packet sent by a user equipment, wherein the first handshake packet is used to establish a first session, and wherein the first session is used to transmit a first service;

sending the first handshake packet to a plurality of first related value added service servers, wherein the plurality of first related value added service servers are a plurality of value added service servers corresponding to the first service;

receiving a request message for a first service sent by the user equipment, wherein the request message for the first service is used to request the first service;

determining the first service requested by the request message for the first service; and sending the request message for the first service, according to a pre-saved correspondence between the first service and a first value added service server, to the first value added service server that is, from the plurality of first related value added service servers, configured to provide a value added service corresponding to the first service.

* * * * *